United States Patent [19]

Grant et al.

[11] 4,137,008
[45] Jan. 30, 1979

[54] ADJUSTABLE BLOWING SLOT FOR CIRCULATION CONTROL AIRFOIL

[75] Inventors: James B. Grant, Windsor, Conn.; George A. McCoubrey, Westfield, Mass.

[73] Assignee: The United States of America as represented by the Secretary of the Navy, Washington, D.C.

[21] Appl. No.: 835,125

[22] Filed: Sep. 21, 1977

[51] Int. Cl.² .............................................. B64C 21/08
[52] U.S. Cl. ................................. 416/20 R; 416/90 A
[58] Field of Search ...................... 416/20 R, 20 A, 22, 416/90 A; 244/199, 204, 207, 212

[56] References Cited

U.S. PATENT DOCUMENTS

| 2,493,041 | 1/1950 | Stalker ................................... 416/20 |
| 3,172,620 | 3/1965 | Darby ................................. 416/20 X |
| 3,719,439 | 3/1973 | Dawson et al. ....................... 416/196 |
| 3,873,233 | 3/1975 | Linck ................................. 416/20 X |
| 3,889,903 | 6/1975 | Hilby ..................................... 244/207 |
| 3,891,163 | 6/1975 | Wilkerson et al. ................... 244/207 |

FOREIGN PATENT DOCUMENTS

| 2258306 | 8/1975 | France ........................................ 416/20 |
| 1244621 | 9/1971 | United Kingdom ....................... 416/20 |

*Primary Examiner*—Everette A. Powell, Jr.
*Attorney, Agent, or Firm*—R. S. Sciascia; Paul S. Collignon

[57] ABSTRACT

A circulation control airfoil having an edge slot formed by upper and lower duct panels. A plurality of struts are spaced along the length of the edge slot and are adjustably attached to the upper and lower duct to maintain the edge slot height. A reinforcing saddle is provided at each attachment position on the panels for distributing load applied to the struts over a large area of the duct panels. Each strut is provided with a differential lead thread system which provides high resolution adjustment capability for the edge slot.

3 Claims, 1 Drawing Figure

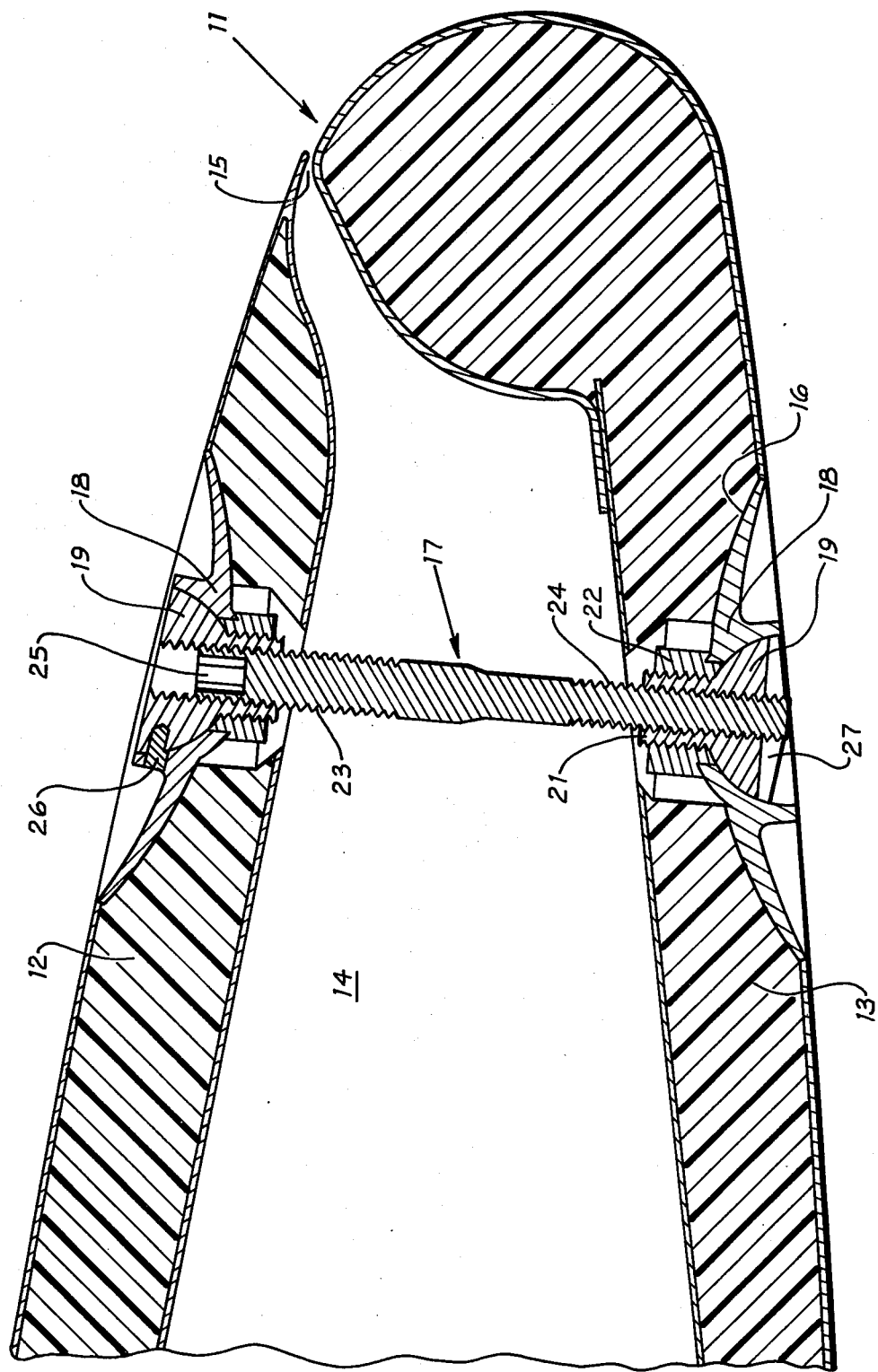

ADJUSTABLE BLOWING SLOT FOR CIRCULATION CONTROL AIRFOIL

BACKGROUND OF THE INVENTION

The present invention relates to a circulation control airfoil and more particularly to an adjustable blowing slot for a circulation control blade for a helicopter.

In a circulation control rotor (CCR) helicopter, the blades are rigidly fixed to the hub and lift is controlled by controlling the circulation of air around each blade. The primary advantage of a CCR helicopter is the reduction of weight of the entire rotor and reduction in number of moving parts associated with the blades; both of these result from the fact that the lift of each blade is modified by changing the circulation of air around it rather than by changing its angle of attack. The resulting rotor is lighter in weight thereby allowing a greater payload for the craft, and also is more reliable.

Circulation control airfoils utilize jets of air blown tangentially to the upper surface of the trailing edge of the airfoil to generate high lift coefficients. Generally the chordwise position of the blowing slot is determined prior to construction so as to inject the jet at the most beneficial chordwise position. The chordwise position is determined by calculating theoretical pressure distributions for the angles of attack and lift coefficients the airfoil is expected to experience. The jet should be located prior to the aft pressure peak so as to maintain airflow attachment on the airfoil. By increasing the circulation about the airfoil, high lift coefficients can be achieved.

Various devices have been employed to make the height of the blowing slot adjustable. One such arrangement is shown in U.S. Pat. No. 3,873,233, which issued Mar. 25, 1975, to Drew W. Linck. In this airfoil, two blowing slots are provided and adjustment is made by screws which are locked in a vertical position by a suitable fastener and in the lower skin of the airfoil. In the event the aft blowing slot height needs to be adjusted after the final assembly of the airfoil, the screws provide adjustment for a riding slot blade and a rib structure. The main disadvantage of arrangements such as that shown in the above-referenced patent is that large stress concentrations exist where the screws penetrate the outer skin.

SUMMARY OF THE INVENTION

The present invention relates to an arrangement for adjusting the height of a blowing slot in a circulation control airfoil. Upper and lower duct panels, which form the outer skin, are provided with premolded dimples of spherical configuration and saddle assemblies are bonded in the dimples. Threaded struts are attached to the saddle assemblies which distribute the strut loads over a substantial area of the duct panels. Each strut engages one saddle in the upper panel and one saddle in the lower panel, and each strut is provided with a differential lead thread system which provides high resolution adjustment capability for the edge slot.

It is therefore a general object of the present invention to provide an improved device for adjusting the height of a blowing slot in an airfoil.

Another object of the present invention is to provide in a circulation control airfoil an arrangement which will distribute the load of adjustable struts over a large area of airfoil panel.

Other objects, advantages, and novel features of the invention will become apparent from the following detailed description of the invention when considered in conjuction with the accompanying drawing.

BRIEF DESCRIPTION OF THE DRAWING

The drawing is a sectional view taken through one strut location of a preferred embodiment of the present invention.

DESCRIPTION OF THE PREFERRED EMBODIMENT

Referring now to the drawing, there is shown, in section, part of an airfoil 11, such as the aft structure of a CCR helicopter blade. Upper duct panel 12 and lower duct panel 13 form a circulation control air duct 14 which terminates with a blowing slot 15. By way of example, panels 12 and 13 might be made of reinforced fiber glass and be honeycombed. A plurality of premolded dimples 16 of spherical contour are provided at each location of a strut 17. The dimpled spherical contour in the outer skin brings the physical hole in the outer skin inwardly to a substantially lower fiber distance from the flatwise bending neutral axis.

Dimples 16 provide a suitable recess for saddles 18 which are adhesively bonded to the panels. Each saddle 18 has an outer spherical contour which seats in a dimple 16 and an inner spherical contour which pivotally positions a thimble 19. Each thimble 19 is provided with a threaded hole which engages a threaded end of a strut 17, and also each thimble 19 is provided with a threaded tubular shank 21 which extends through a hole in saddle 18 and is retained by a locking nut 22. As shown in the drawing, each locking nut 22 has an outer flat face and an inner spherical face which engages with saddle 18.

Each strut 17 functions as a jackscrew and maintains a preestablished spacing between upper duct panel 12 and lower duct panel 13. Also, struts 17 control the height of trailing edge slot 15. As part of the duct 17 structural system, struts 17 react and redistribute portions of the internal pneumatic and external aerodynamic loads, stabilize the upper duct panel 12 during rotor start conditions and, together with the spar aft web, support portions of the rib compression loadings experienced during low rpm ground flapping excitation. By way of example, struts 17 might be made of plated alloy steel threaded rods with a differential lead thread system utilizing standard machine screw thread forms. For example, by using a 10-24 thread (0.0417 lead) on end 23 of struts 17 and a ¼-28 thread (0.0357 lead) on end 24, a differential of 0.006 inch per turn is provided, and thus it can be seen that a high resolution adjustment capability is provided. A hexagonal socket 25 is provided on end 23 to facilitate turning of strut 17. A pin 26 through saddle 18 in upper duct panel 12 engages dimple 19 and prevents rotation of dimple 19 when strut 17 is adjusted, and a screw driver slot 27 is provided in the bottom dimple 19 to facilitate holding of the bottom dimple during adjustment of strut 17.

In one experimental airfoil being designed for a military helicopter, the chordwise and spanwise spacing of the adjustment struts were determined by a loads/deflection analysis of the trailing edge slot members. The blade slot adjustment struts were then located at about the 80 percent chord point with a spanwise spacing of 5 inches between struts. An adjustment capability of zero to 0.180 inch in the slot width was provided.

In manufacturing the embodiment shown in the drawing, the saddle assemblies are bench rigged to set the proper clearance at the spherical seats and the saddle assemblies are subsequently bonded into the panel assemblies. Struts 17 are installed after blade final assembly, leaving duct cavity 14 clear for a pressure bag which is used in the assembly bonding process. The differential lead system on struts 17 provides a high resolution adjustment capability for setting the opening of slot 15.

Obviously many modifications and variations of the present invention are possible in the light of the above teachings. It is therefore to be understood that within the scope of the appended claims the invention may be practiced otherwise then as specifically described.

We claim:

1. A circulation control airfoil comprising,
an upper duct panel and a lower duct panel spaced apart to form an edge slot, each said duct panel having a plurality of dimples therein,
a plurality of saddles attached one each in each said dimple,
a plurality of threaded fasteners positioned in each said saddle, and
a plurality of struts each having a first threaded end of a first pitch threadedly attached to a fastener in said upper duct panel and each having a seconded threaded end of a pitch different from said first pitch threadedly attached to a fastener in said lower duct panel whereby the different thread pitches provide a high resolution adjustment for maintaining the edge slot height and whereby said saddles transfer the load of said struts over a large area of said duct panels.

2. A circulation control airfoil as set forth in claim 1 wherein said saddles are adhesively bonded in said dimples.

3. A circulation control airfoil comprising,
an upper duct panel and a lower duct panel spaced apart to form a trailing edge slot, each said duct panel having a plurality of spherical-shaped dimples therein,
a plurality of spherical-shaped saddles bonded one each in each said spherical-shaped dimple,
a plurality of threaded fasteners pivotally mounted in each said saddle, and
a plurality of struts each having a first threaded end of a first pitch threadedly attached to a fastener in said upper duct panel and each having a seconded threaded end of a pitch different from said first pitch threadedly attached to a fastener in said lower duct panel whereby the different thread pitches provide a high resolution adjustment for maintaining the edge slot height and whereby said saddles transfer the load of said struts over a large area of said duct panels.

* * * * *